United States Patent [19]

Francois

[11] Patent Number: 4,518,221

[45] Date of Patent: May 21, 1985

[54] IMAGE CONDUCTORS WITH A RETICULATED SCREEN

[76] Inventor: Fort François, 71 Ave. de Ségur, 75007 Paris, France

[21] Appl. No.: 446,035

[22] Filed: Dec. 1, 1982

[30] Foreign Application Priority Data

Dec. 3, 1981 [FR] France .................... 81 22624

[51] Int. Cl.³ .............................. G02B 5/14
[52] U.S. Cl. ................ 350/96.26; 350/96.1; 350/508; 350/572
[58] Field of Search ........... 350/96.10, 96.25, 96.26, 350/96.31, 506, 573, 508, 572

[56] References Cited

U.S. PATENT DOCUMENTS

| | | | |
|---|---|---|---|
| 3,567,309 | 3/1971 | Jasgur | 350/96.26 |
| 3,658,407 | 4/1972 | Kitano et al. | 350/96.25 |
| 4,101,196 | 7/1978 | Imai | 350/96.31 |
| 4,148,550 | 4/1979 | MacAnally | 350/573 |
| 4,398,790 | 8/1983 | Righini et al. | 350/96.18 |

*Primary Examiner*—William L. Sikes
*Assistant Examiner*—Frank González
*Attorney, Agent, or Firm*—Oblon, Fisher, Spivak, McClelland & Maier

[57] ABSTRACT

An image conducting device is provided using an index gradient optical fiber on the input of which is projected a screened image, reduced by means of the lens-screen-reducer assembly, the image transmitted on to the output face of said fiber being seen through an eye-piece.

This device is intended more particularly for endoscopes.

3 Claims, 1 Drawing Figure

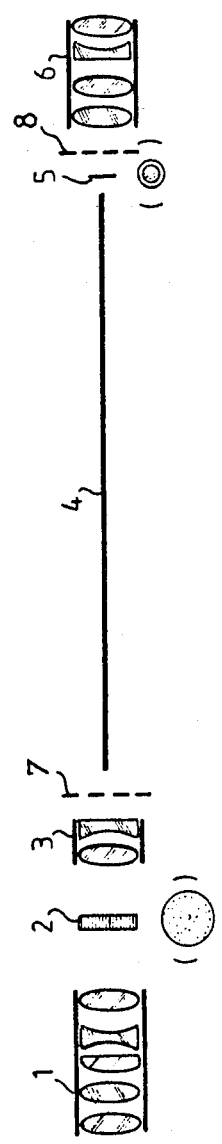

ize the light by placing a first polarizer 7 between

IMAGE CONDUCTORS WITH A RETICULATED SCREEN

BACKGROUND OF THE INVENTION

The present invention relates to improvements to optical fiber image conductors. At present, an image conductor is formed by grouping together a large number of very fine optical fibers whose diameters are between 10 and 12 microns, arranged in an orderly and coherent fashion at both ends of the cable thus formed. On one of the ends of this cable is projected the image to be transmitted, each fiber conducting a light point of the image which is thus transmitted and seen at the other end of the cable by means of an eye-piece.

This type of image conductor operates fairly correctly but the correct orderly arrangement of the fibers forms a considerable disadvantage and a great constraint. In fact, grouping the different fibers together at both ends leads to distortion of the received image.

Multimodal fibers are also known which are used at the present time for transmitting information by modulating the power of the optical wave.

The Applicant has surprisingly discovered that advantage may be taken of the modal architecture of this wave and that it is perfectly possible to use the properties of index gradient and high transmission power fibers.

With this process of modulation, the transmission band of such a fiber may reach several hundred MHz.km or even exceed a GHz.km. When the spectral width of the source is sufficiently small, the limiting phenomenon of the pass-band is the modal dispersion. Now, this modal dispersion does not occur in unimodal fibers whose pass-bands exceed a hundred or so GHz.km. The passband limitation is due to the dispersion of the optical guide and to the polarizing dispersion.

Thus, the Applicant has discovered that in an index gradient multimode fiber, the unimode propagation of one mode takes place without appreciable coupling with the other modes of the fiber.

He has thus discovered that each mode of a fiber is capable of conveying the same amount of information as a unimode fiber, providing that the mode coupling in the fiber is low and that the different modes are excited and recovered separately at the ends of the fiber.

In the experiment that the Applicant has carried out, the modal configuration chosen was a tubular mode for which the light energy remained confined in a region situated at a fixed distance from the axis of the fiber, the light transmitting rays being helical rays having the same axis as that of the fiber.

In this experiment, the source was formed by a non-polarized He-Ne laser of wavelength 0.633 micron. The beam expanded by an afocal assembly passed through a modal filter formed from an opaque plate of 5 mm with perforations situated at its periphery, said plate being clamped between two glass plates so as to form optical cavities one out of two of which is at a pressure slightly less than the atmospheric pressure to create a phase shift equal to TL between the rays which have passed through the cavities.

The image of the filter is projected on to the input face of the fiber with the axis of the beam parallel to that of the fiber.

With a fiber 50 meters in length, the image at the output of the fiber is very little deformed with respect to the image projected at the input, which shows that over this distance, the mode coupling is very low.

This experiment shows that monomode injection and propagation are possible in a highly multimodal index gradient fiber.

It is on the basis of this characteristic of the index gradient fiber that the Applicant has perfected an image conductor which answered better the requirement of practice than previously known image conductors.

SUMMARY OF THE INVENTION

The invention provides an image conducting device comprising an lens projecting the image on to a screen, a reducer forming on the input face of an index gradient fiber the screened image and an eye-piece at the other end of the fiber for viewing the transmitted framed image.

According to an advantageous embodiment of the invention, the frame comprises openings or perforations of a few microns, disposed along concentric circles.

According to another advantageous embodiment of the invention, a first polarizer is placed between the input of the fiber and the frame and a second polarizer between the output of the fiber and the eye-piece.

BRIEF DESCRIPTION OF THE DRAWING

Other features will become clear from the following description with reference to the accompanying drawing in which the singe FIGURE is a schematical view of the image conducting device of the invention.

It should however be understood that the embodiment described hereafter and shown in the accompanying drawing is given solely by way of illustration of the subject of the invention, but forms in no wise a limitation thereof.

DESCRIPTION OF THE PREFERRED EMBODIMENT

According to the invention, the image conducting device shown in the drawing comprises a lens 1 which projects the image on to a very finely reticulated screen 2, preferably of a few microns, the perforations being disposed along concentric circles. The screened image is taken up by a reducing lens 3 which projects the reduced screened image on to the input face of an index gradient optical fiber 4 whose diameter is between 100 and 500 microns.

Each light point of the screened image is transmitted through the fiber in a monomode way and at the output end 5 of the fiber the transmitted screened image is recovered which may be seen by means of an eye-piece 6.

The index gradient of the fiber is determined as a function of the length of the fiber so that the modes cannot be mixed together.

To improve the transmitted image, it may be useful to polarize the light by placing a first polarizer 7 between the screened image and the input face of the fiber and a second polarizer 8 between the screened image outputted and the eye-piece.

As is clear from the foregoing, the invention is in no wise limited to those of its embodiments and modes of application which have just been described more explicitly; it embraces, on the contrary, all variations thereof which may occur to a man skilled in the art, without departing from the scope or spirit of the present invention.

What is claimed is:

1. A device for conducting an image of an object comprising:
   a lens having an optical axis;
   a screen positioned along said optical axis for receiving a projected image from said lens, said screen comprising openings or perforations of a few microns so as to provide an image formed of a plurality of light points;
   a reducing lens positioned along said axis for producing a reduced image formed of a plurality of light points;
   an index gradient optical fiber having an input face and an output face with the plane of said input face being substantially perpendicular to said optical axis and oriented so as to receive said reduced image and for transmitting said light points of said reduced image in a monomode way such that there is formed on said output face of said index gradient optical fiber the transmitted reduced image; and an eye-piece disposed opposite said output face of said index gradient optical fiber.

2. The device of claim 1 wherein said openings or perforations are disposed along concentric circles.

3. The device of claim 1 wherein two polarizers are placed, on the one hand between the input face of the fiber and the screen and, on the other hand, between the output face of the fiber and the eye piece.

* * * * *